US010419333B2

(12) United States Patent
Lin et al.

(10) Patent No.: US 10,419,333 B2
(45) Date of Patent: Sep. 17, 2019

(54) METHOD AND APPARATUS FOR COMPRESSING LABEL STACK, AND METHOD AND APPARATUS FOR DECOMPRESSING LABEL STACK

(71) Applicant: Huawei Technologies Co., Ltd., Shenzhen (CN)

(72) Inventors: Xuefeng Lin, Shenzhen (CN); Enhui Liu, Shenzhen (CN); Guoyi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 15/449,850

(22) Filed: Mar. 3, 2017

(65) Prior Publication Data

US 2017/0180247 A1 Jun. 22, 2017

Related U.S. Application Data

(63) Continuation of application No. PCT/CN2015/086986, filed on Aug. 14, 2015.

(30) Foreign Application Priority Data

Sep. 5, 2014 (CN) .......................... 2014 1 0453368

(51) Int. Cl.
*H04L 12/723* (2013.01)
*H04L 12/721* (2013.01)
(Continued)

(52) U.S. Cl.
CPC ............ *H04L 45/50* (2013.01); *H04L 45/127* (2013.01); *H04L 45/74* (2013.01); *H04L 69/04* (2013.01); *H04L 2212/00* (2013.01)

(58) Field of Classification Search
CPC ....... H04L 45/50; H04L 45/127; H04L 45/74; H04L 69/04
See application file for complete search history.

(56) References Cited

U.S. PATENT DOCUMENTS

2004/0215817 A1 10/2004 Qing et al.
2007/0002850 A1 1/2007 Guichard et al.
(Continued)

FOREIGN PATENT DOCUMENTS

CN 1471282 A 1/2004
CN 1571359 A 1/2005
(Continued)

OTHER PUBLICATIONS

Filsfils et al, "Segment Routing Architecture draft-filsfils-rtgwg-segment-routing-00", Internet-Draft, Intended Status: Standards Track, XP015094844, pp. 1-28, Internet Engineering Task Force (Jun. 28, 2013).
(Continued)

*Primary Examiner* — Andrew Lai
*Assistant Examiner* — Sumitra Ganguly
(74) *Attorney, Agent, or Firm* — Leydig, Voit & Mayer, Ltd.

(57) ABSTRACT

Embodiments of the present application provide a method and an apparatus for compressing a label stack. The method includes: obtaining a first label stack corresponding to a forwarding path, where the first label stack comprises node labels corresponding to each node on the forwarding path; selecting a first node label from the first label stack, where when forwarding a packet, a node corresponding to the first node label is capable of encapsulating at least two layers of labels in the packet; replacing at least two adjacent labels located after the first node label in the first label stack with a first compression label, to generate a second label stack;
(Continued)

and instructing a source node on the forwarding path to perform packet processing according to the second label stack. In this way, a length of a label stack pushed into the packet can be shortened.

14 Claims, 7 Drawing Sheets

(51) Int. Cl.
*H04L 12/741* (2013.01)
*H04L 29/06* (2006.01)

(56) References Cited

U.S. PATENT DOCUMENTS

2011/0122893 A1* 5/2011 Kang ................. H04L 69/04
370/477

2013/0003728 A1* 1/2013 Kwong ................. H04L 45/02
370/389
2014/0369356 A1* 12/2014 Bryant ................. H04L 45/745
370/392

FOREIGN PATENT DOCUMENTS

| | | |
|---|---|---|
| CN | 1283071 C | 11/2006 |
| CN | 1283079 C | 11/2006 |
| CN | 101110773 A | 1/2008 |
| CN | 100450077 C | 1/2009 |
| EP | 1791300 A1 | 5/2007 |
| WO | WO 03073709 A1 | 9/2003 |

OTHER PUBLICATIONS

Li et al., "A Framework of MPLS Global Label, draft-li-mpls-global-label-framework-02," pp. 1-14, Network Working Group (Jul. 3, 2014).

* cited by examiner

METHOD AND APPARATUS FOR COMPRESSING LABEL STACK, AND METHOD AND APPARATUS FOR DECOMPRESSING LABEL STACK

CROSS-REFERENCE TO RELATED APPLICATIONS

This application is a continuation of International Application No. PCT/CN2015/086986, filed on Aug. 14, 2015, which claims priority to Chinese Patent Application No. 201410453368.3, filed on Sep. 5, 2014. The disclosures of the aforementioned applications are hereby incorporated by reference in their entireties.

TECHNICAL FIELD

The present application relates to the field of communications technologies, and in particular, to a method and an apparatus for compressing a label stack and a method and an apparatus for decompressing a label stack.

BACKGROUND

In order to implement fast forwarding of a data packet, there is a segment routing (SR) technology in the prior art. Before a packet is forwarded, a source node establishes, according to a forwarding requirement, a forwarding path (Label Switching Path, LSP) between the source node and a destination node, determines information such as a node and a link on the LSP, and a service to be performed by the node, and adds, in a form of a label stack, the information to the to-be-forwarded packet. In this way, after receiving the packet, a forwarding node on the LSP may perform subsequent processing according to the meaning indicated by a topmost label of the label stack. For example, when the topmost label of the stack is a service segment identification (SID), the forwarding node may perform a service represented by the service SID; when the topmost label is a node SID, the forwarding node may forward the packet to a node represented by the node SID; when the topmost label is a link SID, an intermediate node may perform link-based forwarding according to an indication of the link SID, to forward the packet to a peer node of the intermediate node.

Therefore, it can be known that when the forwarding node forwards the packet along the LSP, if the determined information such as the node and the link on the LSP, and the service to be performed by the node is more, the label stack pushed into the packet is nested with multiple layers of labels, resulting in an excessive large length of the label stack. As a result, a length of the forwarded packet is greatly increased, which is not conducive to transmitting the packet in a network.

SUMMARY

A method and an apparatus for compressing a label stack and a method and an apparatus for decompressing a label stack provided by embodiments of the present application can shorten, when a forwarding node forwards a packet, a length of a label stack pushed into the packet, and further reduce a total length of the packet, which is conducive to transmitting a packet in a network.

Therefore, the embodiments of the present application provide the following technical solutions:

In a first aspect, an embodiment of the present application provides a method for compressing a label stack, where the method includes:

obtaining, by a network device, a first label stack corresponding to a forwarding path, where the first label stack includes node labels corresponding to each node on the forwarding path;

selecting, by the network device, a first node label from the first label stack, where when forwarding a packet, a node corresponding to the first node label is capable of encapsulating at least two layers of labels in the packet;

replacing, by the network device, at least two adjacent labels located after the first node label in the first label stack with a first compression label, to generate a second label stack; and instructing, by the network device, a source node on the forwarding path to perform packet processing according to the second label stack.

In a first possible implementation manner of the first aspect, the selecting, by the network device, a first node label from the first label stack includes:

obtaining, by the network device, $L_i$ and $M_i$, where $L_i$ represents a quantity of layers of labels a node corresponding to a node label i is capable of encapsulating in the packet, $M_i$ represents a quantity of labels associated with the node label i, the labels associated with the node label i are a node label i+1 and a label after the node label i+1, $1 \le i < n$, and n is a quantity of nodes on the forwarding path;

calculating, by the network device, a first difference value $\Delta_i = L_i - M_i$; and selecting, by the network device, the first node label, where the node corresponding to the first node label is capable of encapsulating not less than two layers of labels in the packet, and a first difference value corresponding to the first node label is not less than zero.

With reference to the first possible implementation manner of the first aspect, in a second possible implementation manner, if the first label stack includes at least two node labels whose corresponding nodes are capable of encapsulating not less than two layers of labels in the packet, and first difference values corresponding to the at least two node labels are not less than zero, the quantity of labels associated with the first node label is the largest among quantities of labels associated with the at least two node labels.

With reference to the first or the second possible implementation manner of the first aspect, in a third possible implementation manner, if i=n, $M_n$ is zero or $M_n$ is a quantity of labels after a node label n.

With reference to any one of the first to the third possible implementation manners of the first aspect, in a fourth possible implementation manner, after the second label stack is generated, the method further includes:

obtaining, by the network device, $L_j$ and $M_j$, where $L_j$ represents a quantity of layers of labels a node corresponding to a node label j is capable of encapsulating in the packet, $M_j$ represents a quantity of labels associated with the node label j, the labels associated with the node label j are a node label j+1 and a label after the node label j+1, $1 \le j < m$, and $m \le n$;

calculating, by the network device, a second difference value $\Delta_j = L_j - M_j$;

selecting, by the network device, a second node label, where a node corresponding to the second node label is capable of encapsulating not less than two layers of labels in the packet, and a second difference value corresponding to the second node label is not less than zero; and replacing, by the network device, at least two adjacent labels located after the second node label in the second label stack with a second compression label, to generate a third label stack, where the at least two adjacent labels after the second node label include the first compression label; and correspondingly, the instructing, by the network device, a source node on the forwarding path to perform packet processing according to the second label stack is:

instructing, by the network device, the source node on the forwarding path to perform packet processing according to the third label stack.

With reference to any one of the first aspect or the first to the fourth possible implementation manners of the first aspect, in a fifth possible implementation manner, before the selecting, by the network device, a first node label from the first label stack, the method further includes:

determining, by the network device, whether the source node is capable of encapsulating at least two layers of labels in the packet, and if the source node is capable of encapsulating at least two layers of labels in the packet, performing a step of selecting a first node label from the first label stack.

With reference to any one of the first aspect or the first to the fifth possible implementation manners of the first aspect, in a sixth possible implementation manner, the node label is a node segment identification SID or a link SID.

In a second aspect, an embodiment of the present application provides a method for decompressing a label stack, where the method includes:

obtaining, by a forwarding node, label configuration information of the forwarding node, where the label configuration information includes a correspondence between a compression label and compressed labels, and the compressed labels include at least two labels;

receiving, by the forwarding node, a packet sent from a source node, where the packet includes a first label stack, and the first label stack includes the compression label;

replacing, by the forwarding node according to the label configuration information, the compression label in the first label stack with the compressed labels, to generate a second label stack; and processing, by the forwarding node, the packet according to the second label stack.

In a first possible implementation manner of the second aspect, the processing, by the forwarding node, the packet according to the second label stack includes:

if a topmost label of the second label stack is a node label, forwarding, by the forwarding node, the packet to a node corresponding to the node label; or if a topmost label of the second label stack is a service label, performing, by the forwarding node, a service corresponding to the service label for the packet.

According to a third aspect, an embodiment of the present application provides an apparatus for compressing a label stack, where the apparatus includes:

a label stack obtaining unit, configured to obtain a first label stack corresponding to a forwarding path, where the first label stack includes node labels corresponding to each node on the forwarding path;

a first selection unit, configured to select a first node label from the first label stack obtained by the label stack obtaining unit, where when forwarding a packet, a node corresponding to the first node label is capable of encapsulating at least two layers of labels in the packet;

a first replacement unit, configured to replace at least two adjacent labels located after the first node label in the first label stack with a first compression label, to generate a second label stack; and an instruction unit, configured to instruct a source node on the forwarding path to perform the packet processing according to the second label stack generated by the first replacement unit.

In a first possible implementation manner of the third aspect, the first selection unit includes:

a first obtaining unit, configured to obtain $L_i$ and $M_i$, where $L_i$ represents a quantity of layers of labels a node corresponding to a node label i is capable of encapsulating in the packet, $M_i$ represents a quantity of labels associated with the node label i, the labels associated with the node label i are a node label i+1 and a label after the node label i+1, $1 \leq i < n$, and n is a quantity of nodes on the forwarding path;

a first calculation unit, configured to calculate according to $L_i$ and $M_i$ obtained by the first obtaining unit, a first difference value $\Delta_i = L_i - M_i$; and a selection subunit, configured to select the first node label, where the node corresponding to the first node label is capable of encapsulating not less than two layers of labels in the packet, and a first difference value corresponding to the first node label is not less than zero.

With reference to the first possible implementation manner of the third aspect, in a second possible implementation manner, the apparatus further includes:

a second obtaining unit, configured to obtain $L_j$ and $M_j$, after the first replacement unit generates the second label stack, where $L_j$ represents a quantity of layers of labels a node corresponding to a node label j is capable of encapsulating in the packet, $M_j$ represents a quantity of labels associated with the node label j, the labels associated with the node label j are a node label j+1 and a label after the node label j+1, $1 \leq j < m$, and $m \leq n$;

a second calculation unit, configured to calculate, according to $L_j$ and $M_j$ obtained by the second obtaining unit, a second difference value $\Delta_j = L_j - M_j$;

a second selection unit, configured to select a second node label, where a node corresponding to the second node label is capable of encapsulating not less than two layers of labels in the packet, and a second difference value corresponding to the second node label is not less than zero; and a second replacement unit, configured to replace at least two adjacent labels located after the second node label in the second label stack with a second compression label, to generate a third label stack, where the at least two adjacent labels after the second node label include the first compression label; and correspondingly, the instruction unit is specifically configured to instruct the source node on the forwarding path to perform packet processing according to the third label stack generated by the second replacement unit.

With reference to the third aspect or the first or the second possible implementation manner of the third aspect, in a third possible implementation manner, the apparatus further includes:

a determining unit, configured to determine, before the first selection unit selects the first node label, whether the source node is capable of encapsulating at least two layers of labels in the packet, and if the source node is capable of encapsulating at least two layers of labels in the packet, instruct the first selection unit to select the first node label.

According to a fourth aspect, an embodiment of the present application provides an apparatus for decompressing a label stack, where the apparatus includes:

an obtaining unit, configured to obtain label configuration information of a node, where the label configuration information includes a correspondence between a compression label and compressed labels, and the compressed labels include at least two labels;

a receiving unit, configured to receive a packet sent from a source node, where the packet includes a first label stack, and the first label stack includes the compression label;

a replacement unit, configured to replace, according to the label configuration information obtained by the obtaining unit, the compression label in the first label stack comprised in the packet received by the receiving unit with the compressed labels, to generate a second label stack; and a processing unit, configured to process the packet according to the second label stack.

In a first possible implementation manner of the fourth aspect, the processing unit is specifically configured to forward, when a topmost label of the second label stack is a node label, the packet to a node corresponding to the node label; or the processing unit is specifically configured to perform, when a topmost label of the second label stack is a service label, a service corresponding to the service label for the packet.

In the method and apparatus for compressing a label stack in the embodiments of the present application, a network device selects a first node label from a first label stack, where when forwarding a packet, a node corresponding to the first node label is capable of encapsulating at least two layers of labels in the packet; in this way, compression processing may be performed on the first label stack, and at least two adjacent labels located after the first node label in the first label stack may be replaced with a first compression label to generate a second label stack. According to the foregoing technical solutions, when a forwarding node forwards a packet, a length of a label stack pushed into the packet can be shortened, and further a total length of the packet can be reduced, which is conducive to transmitting the packet in a network.

BRIEF DESCRIPTION OF DRAWINGS

To describe the technical solutions in the embodiments of this application more clearly, the following briefly introduces the accompanying drawings required for describing the embodiments. Apparently, the accompanying drawings in the following description merely show some embodiments of this application, and a person of ordinary skill in the art may still derive other drawings from these accompanying drawings.

DESCRIPTION OF EMBODIMENTS

In order to make a person skilled in the art better understand technical solutions of the present application, with reference to the accompanying drawings and implementation manners, a further detailed description of embodiments of the present application will be given below.

Figure 1:
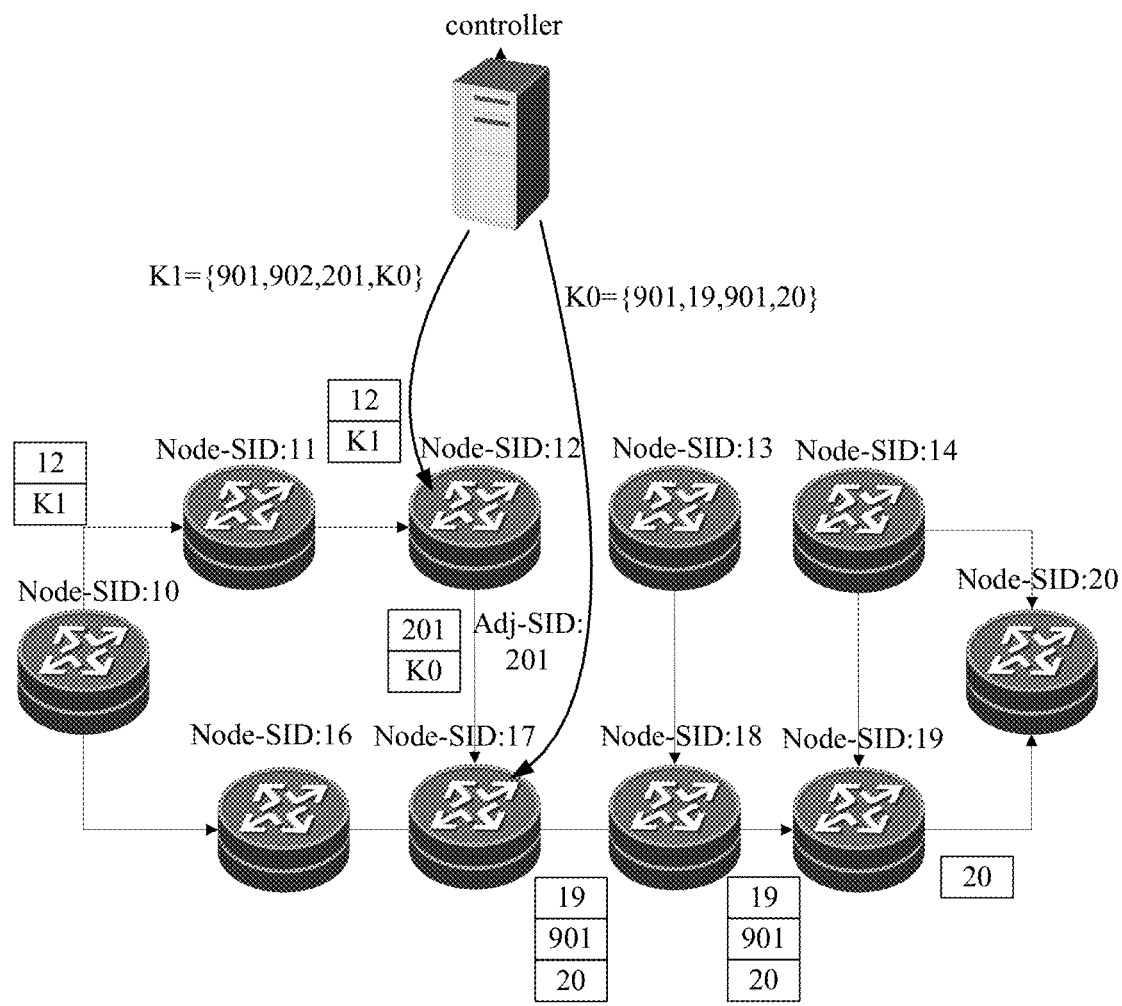
FIG. 1 is a schematic structural diagram of a network according to an embodiment of the present application.

Before a packet is forwarded, an LSP between a source node and a destination node may be first established according to a service requirement, information such as a node and a link on the LSP, and a service to be performed by the node is determined, and the information is added, in the form of a label stack, to the to-be-forwarded packet to instruct a node on the LSP to perform packet processing according to the label stack. Implementing a real-time service from a node 10 to a node 20 in a network shown in FIG. 1 is taken as an example. A label stack corresponding to the LSP may be: {12, 901, 902, 201, 901, 19, 901, 20}. Among them, 12, 19 and 20 are node SIDs, and the node SIDs correspond to nodes on the LSP; 901 and 902 are service SIDs, and the service SIDs correspond to services performed by nodes; and 201 is a link SID, and the link SID corresponds to a link between two nodes. In this example, 201 may represent a link between a node 12 and a node 17.

Instructing the node on the LSP to perform packet processing according to the label stack may be understood as: determining a type of a stack top SID, and if the stack top SID is a service SID, performing a service corresponding to the service SID; or if the stack top SID is a node SID or a link SID, forwarding the packet to a node corresponding to the node SID or the link SID. Taking {19, 901, 20} in the label stack as an example, after a node 19 pops (pop) a node SID 19 of the node 19, a topmost label is determined as a service SID 901, and the node 19 may perform a service corresponding to 901 for the packet locally; thereafter, the topmost label is determined as a node SID 20, and the node 19 may forward the packet to the node 20.

For the service SID, different nodes may use one service SID to represent one service, for example, both a service 901 to be performed by the node 12 and a service 901 to be performed by the node 19 may represent a firewall service; or different nodes may use one service SIDs to represent different services, for example, a service 901 to be performed by the node 12 may represent a firewall service, and a service 901 to be performed by the node 19 may represent a deep packet inspection service. A service represented by the service SID may not be specifically defined in the embodiments of the present application.

In the foregoing example, the label stack {12, 901, 902, 201, 901, 19, 901, 20} includes eight labels, that is, a source node 10 needs to push the eight labels into the to-be-forwarded packet, occupying relatively large packet space. In view of this, the embodiments of the present application are provided, and are used to shorten a length of the label stack.

It should be noted that a network device in an embodiment of the present application may be an independent device, and the network device may communicate with a controller and/or a node on a forwarding path. If the network device communicates with the controller, the network device may deliver a label stack compressed by using a solution of an embodiment of the present application to a source node via the controller. If the network device communicates with the node on the forwarding path, the network device may directly deliver a compressed label stack to a source node, or the network device may deliver a compressed label stack to a source node via another node on the forwarding path. Alternatively, referring to FIG. 1, the network device in this embodiment of the present application may be a controller integrating a function of the network device, or may be a node, on the forwarding path, integrating a function of the network device. For example, the source node 10 integrates a function of the network device, and may first perform compression processing on the label stack after obtaining the label stack, and then push the compressed label stack into the packet. A representation form of the network device may not be specifically defined in the embodiments of the present application.

A method for compressing a label stack in an embodiment of the present application will be illustrated below.

Figure 2:
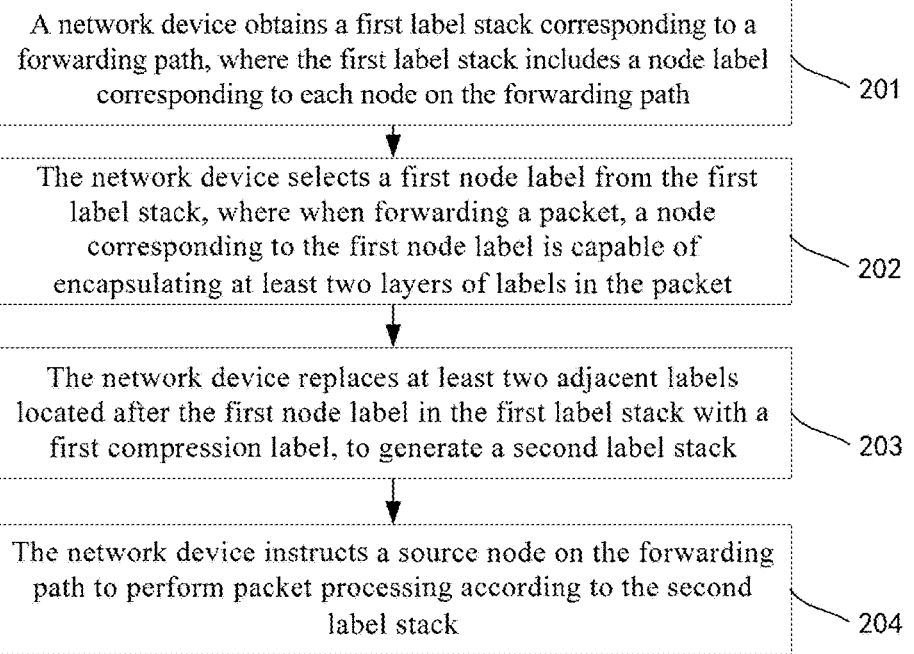
FIG. 2 is a schematic flowchart of a method for compressing a label stack according to an embodiment of the present application.

Referring to FIG. 2, an embodiment of the present application provides a method for compressing a label stack, where the method includes the following steps.

201. A network device obtains a first label stack corresponding to a forwarding path, where the first label stack includes node labels corresponding to each node on the forwarding path.

The network device may first obtain the label stack corresponding to the LSP to make clear an object of compression processing. As an example, the network device may generate a label stack according to a service requirement, or the network device may receive a label stack generated by another device. A manner of obtaining the label stack by the network device may not be specifically defined in this embodiment of the present application.

With reference to the network shown in FIG. 1, in an example in which the network device generates a label stack for a service between a node 10 and a node 20, a process of obtaining the label stack by the network device may be as follows:

(1) The network device obtains a service capability of a node in the network.

As an example, the network device may obtain the service capability of the node when the label stack needs to be generated, or the network device may obtain the service capability of the node after the node is powered up, which may not be specifically defined in this embodiment of the present application. If different nodes use one service SID to represent one service, the service capability may be a service identification, for example, a service SID; or if different nodes use different service SIDs to represent one service, the service capability may be a service name and a service identification, for example, a firewall service and a corresponding service SID.

As an example, the node may use the intermediate system to intermediate system (ISIS) protocol or the open shortest path first (OSPF) protocol to report the service capability of this node to the network device; or the node may use a service capability report message provided by this embodiment of the present application to report the service capability of this node to the network device. Specifically, the service capability report message may include: a message type, a message length, and service capability parameters. For example, the message type is service capability report, which may be represented using two bytes; the service capability parameters are: a node SID 12, a service SID 901, a firewall service, a service SID 902 and a deep packet inspection service, where each parameter may be represented using four bytes; the message length is a total quantity of bytes included by the service capability report message, which may be represented using two bytes. Therefore, in this example, the message length is 24 bytes. Correspondingly, after the network device receives the service capability report message in the foregoing example, it can be seen that a node 12 may perform the firewall service and the deep packet inspection service. In this way, when the service between the node 10 and the node 20 includes the firewall service and the deep packet inspection service, the network device may determine the node 12 as the node on the LSP, and the label stack corresponding to the LSP includes: the node SID 12 corresponding to the node 12, the service SID 901 corresponding to the firewall service, and the service SID 902 corresponding to the deep packet inspection service.

(2) The network device obtains the first label stack corresponding to the LSP.

The network device determines, according to a service requirement, the LSP between the node 10 and the node 20, and a service to be performed by each node on the LSP, and generates the first label stack accordingly. For example, the first label stack may be {12, 901, 902, 201, 901, 19, 901, 20}. In this way, the network device obtains the first label stack corresponding to the LSP, and the first label stack includes node labels corresponding to each node on the LSP. As an example, the node label may be a node SID or A link SID. In this example, the node labels included in the first label stack are: 12, 201, 19 and 20.

202. The network device selects a first node label from the first label stack, where when forwarding a packet, a node corresponding to the first node label is capable of encapsulating at least two layers of labels in the packet.

203. The network device replaces at least two adjacent labels located after the first node label in the first label stack with a first compression label, to generate a second label stack.

In order to shorten a length of the first label stack and further to reduce a total length of the packet, so as to facilitate transmission of the packet in the network, the network device in this embodiment of the present application may perform compression processing on the first label stack, replace the at least two adjacent labels in the first label stack with the first compression label, to generate the second label stack including the first compression label. Meanwhile, in order to ensure that a node on the LSP may use the second label stack to correctly process the packet, the node on the LSP may perform decompression processing on the second label stack, and restore the first compression label to the at least two adjacent labels. It should be noted that, being located after the first node label in the first label stack may also be understood as being located below the first node label, and specifically as in a direction from a stack top to a stack bottom of the first label stack. For example, if the first node label is 201, labels 901, 19, 901 and 20 all are labels located after the first node label. In addition, the at least two adjacent labels may be understood as that the at least two labels are contiguous. For example, the labels 901, 19, 901 and 20 are adjacent to each other.

It should be noted that a node in the network has a specific label processing capability, and the label processing capability may be understood as a quantity of layers of labels that can be encapsulated in the packet by the node when forwarding a packet, that is, a quantity of labels that can be pushed into the packet by the node. For example, a node A can encapsulate three layers of labels, that is, the node A can push three labels into the packet.

The network device may first select the first node label from the first label stack when performing compression processing. A node corresponding to the first node label can encapsulate at least two layers of labels in the packet. In this way, when the node corresponding to the first node label performs decompression processing, at least two adjacent labels obtained through decompression may be correctly pushed into the packet.

For example, for a first label stack {12, 901, 902, 201, 901, 19, 901, 20}, the first node label selected by the network device is a label 201, and the label corresponds to a node 17. If the node 17 can encapsulate four layers of labels in the packet, when compression processing is being performed, labels 901, 19, 901 and 20 may be replaced with a first compression label K0 to generate a second label stack {12, 901, 902, 201, K0}. In this way, a length of the label stack is reduced from eight to five, which is conducive to reducing space occupied by the label stack in the packet. Correspondingly, when the node on the LSP performs packet processing according to the second label stack, a label stack forwarded to the node 17 by the node 12 is {201, K0}. The node 17 may perform decompression processing to restore K0 as {901, 19, 901, 20}, perform a service corresponding to the label 901, and push three labels, namely 19, 901 and 20 into the packet to instruct a node 19 to perform packet processing according to the label stack. Because a quantity (three) of labels that need to be pushed into the packet is not greater than a quantity of layers (four layers) of labels that can be encapsulated in the packet by the node 17, the node 17 can correctly push the restored labels into the packet.

It should be noted that, the network device may select a node label corresponding to any node that can encapsulate at least two layers of labels in the packet as the first node label, may select a node label corresponding to a node that can encapsulate a maximum quantity of layers of labels in the packet as the first node label, may select the first node label according to a manner shown in FIG. 3 below, or the like. A manner of selecting the first node label by the network device may not be specifically defined in this embodiment of the present application.

In addition, it should be noted that, the at least two adjacent labels replaced with the first compression label may be all labels after the first node label, or may be some of labels after the first node label. For example, when the first node label is the label 201, the labels 901, 19, 901 and 20 may be replaced with the first compression label K0, or the labels 19, 901 and 20 may be replaced with the first compression label K0, or the labels 901 and 20 may be replaced with the first compression label K0, which may not be specifically defined in this embodiment of the present application. Preferably, from a perspective of correctly pushing the decompressed label into the packet, a quantity of the at least two adjacent labels replaced with the first compression label is not greater than a quantity of layers of labels that can be encapsulated in the packet by the node corresponding to the first node label.

204. The network device instructs a source node on the forwarding path to perform packet processing according to the second label stack.

After generating the second label stack, the network device may instruct the source node on the LSP to push the second label stack into the to-be-forwarded packet, so as to allow the source node to perform packet processing according to the second label stack. Compared with the first label stack, a length of the second label stack is reduced to some extent, which may reduce a total length of the packet.

Figure 3:
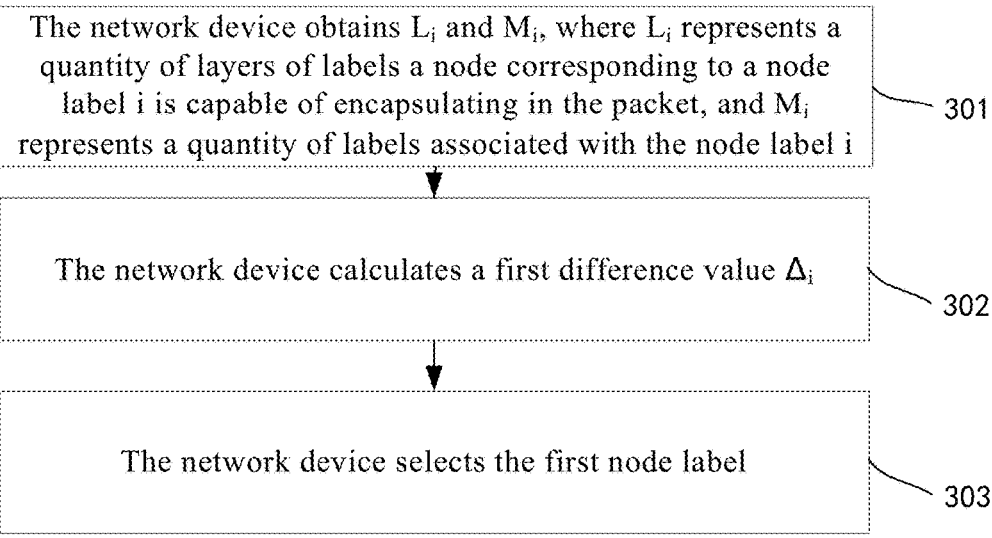
FIG. 3 is a schematic flowchart of selecting a first node label according to an embodiment of the present application.

Referring to FIG. 3, this embodiment of the present application further provides a method for selecting a first node label, where the method includes following steps.

301. The network device obtains $L_i$ and $M_i$, where $L_i$ represents a quantity of layers of labels a node corresponding to a node label i is capable of encapsulating in the packet, $M_i$ represents a quantity of labels associated with the node label i, the labels associated with the node label i are a node label i+1 and a label after the node label i+1, $1 \le i < n$, and n is a quantity of nodes on the forwarding path.

302. The network device calculates a first difference value $\Delta_i = L_i - M_i$.

303. The network device selects the first node label, where the node corresponding to the first node label is capable of encapsulating not less than two layers of labels in the packet, and a first difference value corresponding to the first node label is not less than zero.

When selecting the first node label, the network device may obtain information in the following two aspects.

(a) The quantity $L_i$ of layers of labels that can be encapsulated in the packet by the node corresponding to the node label i As an example, when needing to select the first node label, the network device may obtain the quantity of layers of labels that can be encapsulated in the packet by the node, or after the node is powered up, the network device may obtain the quantity of layers of labels that can be encapsulated in the packet by the node, which may not be specifically defined in this embodiment of the present application.

For example, for the first label stack {12, 901, 902, 201, 901, 19, 901, 20} in the foregoing example, the quantity of nodes on the LSP is n=4, that is, the quantity of node labels included in the first label stack is n=4. A quantity of layers of labels that can be encapsulated in the packet by the node 12 is $L_1=3$, a quantity of layers of labels that can be encapsulated in the packet by the node 17 $L_2=3$, a quantity of layers of labels that can be encapsulated in the packet by the node 19 is $L_3=4$, and a quantity of layers of labels that can be encapsulated in the packet by the node 20 is $L_4=2$.

(b) The Quantity $M_i$ of Layers of Labels Associated with the Node Label i

As an example, the labels associated with the node label i are the node label i+1 and the label after the node label i+1. For example, for the first label stack {12, 901, 902, 201, 901, 19, 901, 20} in the foregoing example, a quantity of labels associated with the node 12 is $M_1=5$, a quantity of labels associated with the node 17 is $M_2=3$, a quantity of labels associated with the node 19 is $M_3=1$, and a quantity of labels associated with the node 20 is $M_4=0$.

After obtaining $L_i$ and $M_i$ the network device may calculate the first difference value $\Delta_i = L_i - M_i$ corresponding to the node so as to further select the first node label from the first label stack. Specifically, the node corresponding to the first node label can encapsulate not less than two layers of labels in the packet, and the first difference value corresponding to the first node label is not less than zero.

For example, for the first label stack {12, 901, 902, 201, 901, 19, 901, 20} in the foregoing example, the node 12 corresponds to $L_1=3$ and $\Delta_1=-2$, the node 17 corresponds to $L_2=3$ and $\Delta_2=0$, the node 19 corresponds to $L_3=4$ and $\Delta_3=3$, and the node 20 corresponds to $L_4=2$ and $\Delta_4=2$. The network device may select the first node label from three node labels corresponding to the nodes 17, 19 and 20. For example, the network device may randomly select one of the three node labels as the first node label, for example, selecting a node label corresponding to the node 19 as the first node label. Alternatively, the network device may select a node label of which $M_i$ is the largest as the first node label, for example, selecting a node label corresponding to the node 17 of which $M_2=3$ as the first node label. It should be noted that, selecting a node label of which $M_i$ is the largest as the first node label may be understood as that, the quantity of labels associated with the first node label is the largest among quantities of labels associated with all node labels in the first label stack.

Optionally, in order to maximally improve compression efficiency, the network device may select, as the first node label, a node label of which $L_i \geq 2$, $\Delta_i \geq 0$ and $M_i$ is the largest, and replace all labels after the first node label with the first compression label. For example, in the foregoing example, a node label 201 corresponding to the node 17 is selected as the first node label, and the labels 901, 19, 901 and 20 after the first node label are replaced with the first compression label K0. In this way, eight labels in the first label stack may be compressed into five labels through single compression processing, and the highest compression efficiency may be achieved compared with a solution of selecting another node label as the first node label.

Optionally, on the basis of the foregoing solution shown in FIG. 3, a value of a quantity $M_n$ of labels associated with the last node label n in the first label stack may be obtained in the following two manners. Manner 1: $M_n=0$. Manner 2: $M_n$ is a quantity of labels after the node label n. Specifically, the network device may determine an obtaining manner of $M_n$ according to $L_{n-1}$ and $M_{n-1}$ that are corresponding to a node label n−1. If $L_{n-1} \geq M_{n-1}$, the network device may obtain $M_n$ according to any one of the foregoing two manners; or if $L_{n-1} < M_{n-1}$, the network device may obtain $M_n$ according to the second manner, which may not be specifically defined in this embodiment of the present application.

Based on the solution of compressing the label stack provided by FIG. 2 or FIG. 3, in order to further shorten the length of the label stack and improve a possibility of successful LSP establishment, this embodiment of the present application further provides the following preferable solution, which is illustrated below.

It should be noted that, the successful LSP establishment may be understood as that the source node can correctly push the label stack into the to-be-forwarded packet, that is, the length of the label stack is not greater than a quantity of layers of labels that can be encapsulated in a packet by the source node.

After compressing the label stack according to the solution shown in FIG. 2 or FIG. 3, the network device may determine whether the length of the second label stack is greater than the quantity of layers of labels that can be encapsulated in a packet by the source node; and if the length of the second label stack is not greater than the quantity of layers of labels that can be encapsulated in the packet by the source node, it is determined that the source node can correctly push the second label stack into the to-be-forwarded packet; or if the length of the second label stack is greater than the quantity of layers of labels that can be encapsulated in the packet by the source node, it is determined that the source node cannot correctly push the second label stack into the to-be-forwarded packet, and that compression processing still needs to be performed on the second label stack.

For example, for the second label stack {12, 901, 902, 201, K0} in the foregoing example, the length of the label stack is 5. If the quantity of layers of labels that can be encapsulated in a packet by a source node 10 is $L_0=6$, it indicates that the source node 10 can correctly push the second label stack into the to-be-forwarded packet. If the quantity of layers of labels that can be encapsulated in a packet by the source node 10 is $L_0=4$, it indicates that the source node 10 cannot correctly push the second label stack into the to-be-forwarded packet, and compression processing can be further performed on the second label stack to shorten the length of the second label stack.

For the solution of further performing compression processing on the second label stack, refer to FIG. 2, where a second node label is selected from the second label stack. Similarly, a node corresponding to the second node label can also encapsulate at least two layers of labels in the packet. For processes of selecting the second node label, replacing a second compression label, and the like, refer to the foregoing descriptions, which are not described herein again.

Figure 4:
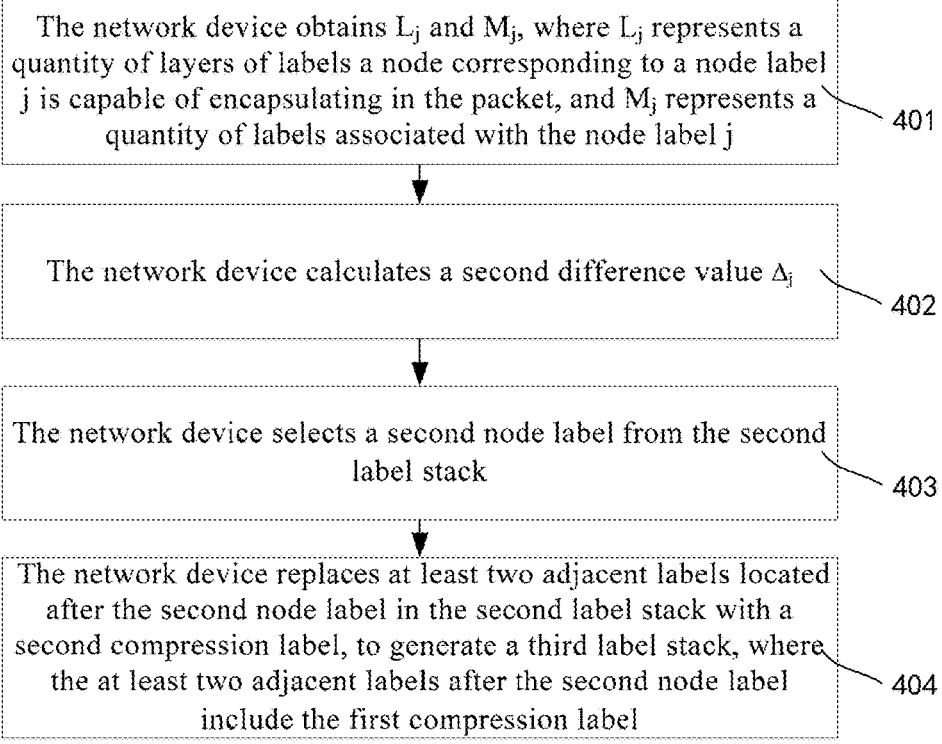
FIG. 4 is a schematic flowchart of generating a third label stack according to an embodiment of the present application.

Optionally, if the network device selects the first node label according to the method shown in FIG. 3, this embodiment of the present application further provides a method for generating a third label stack. Referring to FIG. 4, the method includes followings steps.

401. The network device obtains $L_j$ and $M_j$, where $L_j$ represents a quantity of layers of labels a node corresponding to a node label j is capable of encapsulating in the packet, $M_j$ represents a quantity of labels associated with the node label j, the labels associated with the node label j are a node label j+1 and a label after the node label j+1, $1 \leq j < m$, $m \leq n$, and m is a quantity of node labels included by the second label stack.

402. The network device calculates a second difference value $\Delta_j = L_j - M_j$.

403. The network device selects a second node label from the second label stack, where a node corresponding to the second node label is capable of encapsulating not less than two layers of labels in the packet, and a second difference value corresponding to the second node label is not less than zero.

404. The network device replaces at least two adjacent labels located after the second node label in the second label stack with a second compression label, to generate a third label stack, where the at least two adjacent labels after the second node label include the first compression label.

For example, if the second label stack is {12, 901, 902, 201, K0}, and the quantity of layers of labels that can be encapsulated in a packet by the source node 10 is $L_0=4$, a quantity of node labels in the second label stack is m=2, the node 12 corresponds to $L_1=3$, $M_1=2$ and $\Delta_1=1$, and the node 17 corresponds to $L_2=3$, $M_2=0$ and $\Delta_2=3$. Based on this, the network device may select the node label corresponding to the node 12 as the second node label.

As an example, the network device may replace all labels after the second node label with the second compression label, for example, replacing the labels 901, 902, 201 and K0 with K1. Alternatively, the network device may replace some of labels after the second node label with the second compression label, such as replacing the labels 902, 201 and K0 with K1, or replacing the labels 201 and K0 with K1, or replacing the labels 901, 902 and 201 with K1, which may not be specifically defined in this embodiment of the present application.

Similarly, after generating the third label stack, the network device may further continue to determine whether a length of the third label stack is greater than the quantity of layers of labels that can be encapsulated in the packet by the source node, and if the length of the third label stack is greater than the quantity of layers of labels that can be encapsulated in the packet by the source node, continue to perform compression processing according to the solution in this embodiment of the application until a length of the compressed label stack is not greater than the quantity of layers of labels that can be encapsulated in the packet by the source node. For details thereof, refer to the following example shown in FIG. 6A and FIG. 6B, which is not described herein again.

Figure 5:
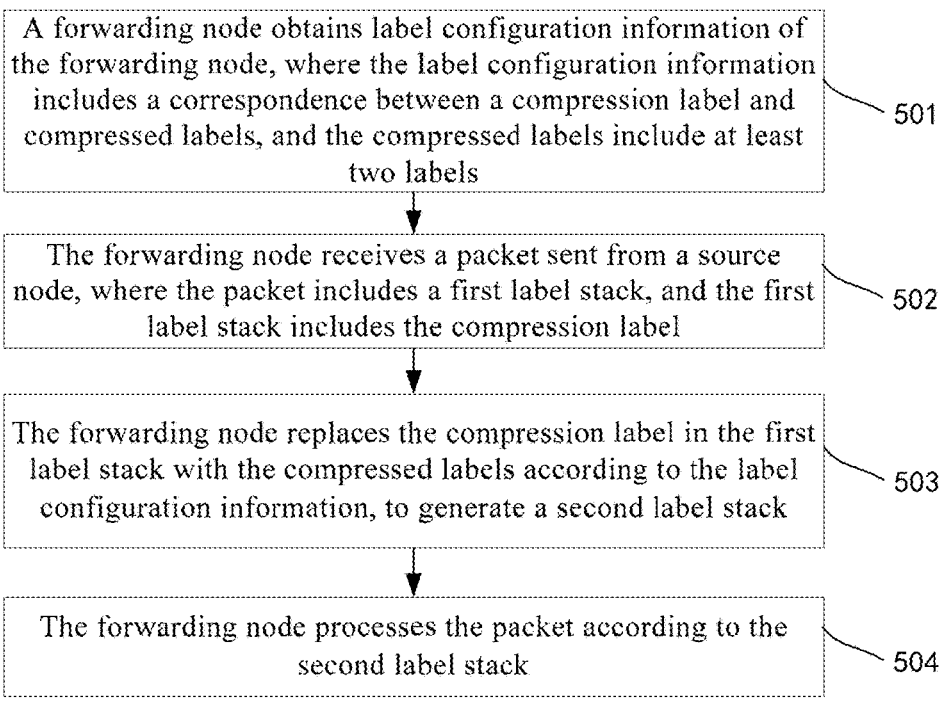
FIG. 5 is a schematic flowchart of a method for decompressing a label stack according to an embodiment of the present application.

Corresponding to the foregoing method for compressing a label stack, an embodiment of the present application further provides a method for decompressing a label stack. Referring to FIG. 5, the method includes following steps.

501. A forwarding node obtains label configuration information of the forwarding node, where the label configuration information includes a correspondence between a compression label and compressed labels, and the compressed labels include at least two labels.

502. The forwarding node receives a packet sent from a source node, where the packet includes a first label stack, and the first label stack includes the compression label.

503. The forwarding node replaces the compression label in the first label stack with the compressed labels according to the label configuration information, to generate a second label stack.

504. The forwarding node processes the packet according to the second label stack.

When performing decompression processing, the forwarding node may first obtain information in the following two aspects.

(1) The Forwarding Node Obtains the Label Configuration Information.

As an example, when needing to perform decompression processing, the forwarding node may obtain the label configuration information, or after a network device generates the compression label, the forwarding node may obtain the label configuration information, which may not be specifically defined in this embodiment of the present application.

For example, for a label stack {12, 901, 902, 201, 901, 19, 901, 20} corresponding to an LSP, after performing compression processing, the network device obtains a label stack {12, K1} which has the following two pieces of label configuration information correspondingly: first label configuration information K1={901, 902, 201, K0} for a node 12 and second label configuration information K0={901, 19, 901, 20} for a node 17.

In this embodiment of the present application, the forwarding node may be any one of a source node, a relay node, or a destination node on the LSP. If the forwarding node is the node 12, the first label configuration information may be obtained.

(2) The forwarding node obtains the first label stack.

If the forwarding node is the source node, the forwarding node may obtain the first label stack from the network device; if the forwarding node is the relay node or the destination node, the forwarding node may receive a packet sent from the source node and obtain the first label stack from the packet. A manner of obtaining the first label stack by the forwarding node may not be specifically defined in this embodiment of the present application.

After obtaining the information in the foregoing two aspects, the forwarding node may use the information in the two aspects to replace the compression label in the first label stack with the compressed labels, to generate the second label stack, and perform packet processing according to the second label stack. It should be noted that, the compressed labels may include at least two labels, and the at least two labels are adjacent to each other in the second label stack.

If the forwarding node is the node 12, the obtained first label configuration information is K1={901, 902, 201, K0}, the obtained first label stack is {12, K1}. The node 12 may replace the compression label K1 with the labels 901, 902, 201 and K0, and perform packet processing according to the labels replaced with through decompression: a topmost label 901 is popped first, and a service corresponding to the label 901 is performed on the packet locally; then a topmost label 902 is popped, and a service corresponding to the label 902 is performed on the packet locally; and then a topmost label 201 is popped, the labels 201 and K0 are pushed into the packet, and the packet is forwarded to the node 17 through a link corresponding to the label 201.

It should be noted that, as shown in FIG. 3, the forwarding node may obtain the label configuration information of the forwarding node first and then obtain the first label stack; or the forwarding node may obtain the first label stack first and then obtain the label configuration information of the forwarding node; or the forwarding node may obtain the information in the foregoing two aspects at the same time, which may not be specifically defined in this embodiment of the present application.

Figure 6A:
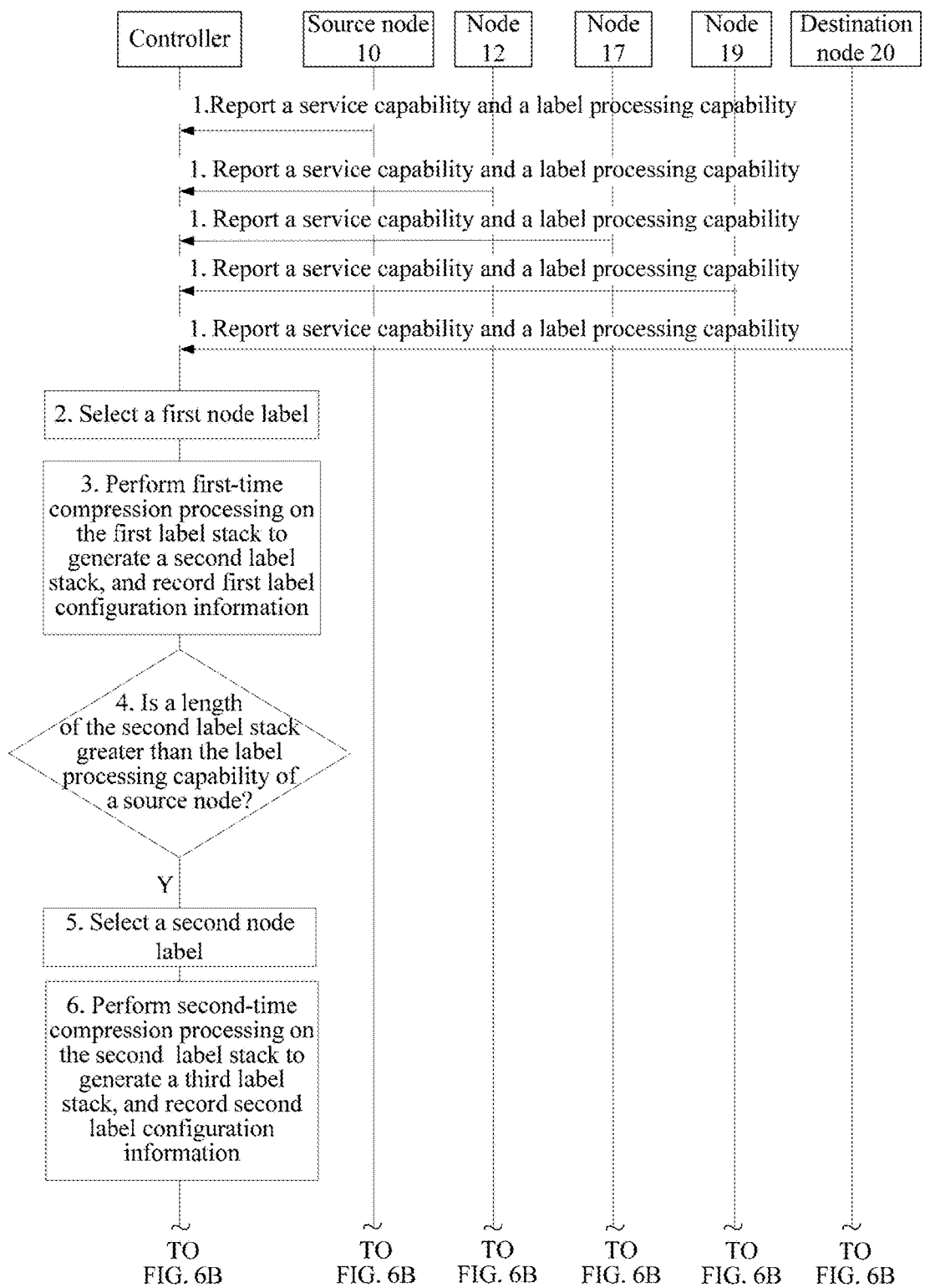
FIG. 6A and FIG. 6B are schematic diagrams of generating a label stack meeting a label processing capability of a source node according to an embodiment of the present application.
Figure 6B:
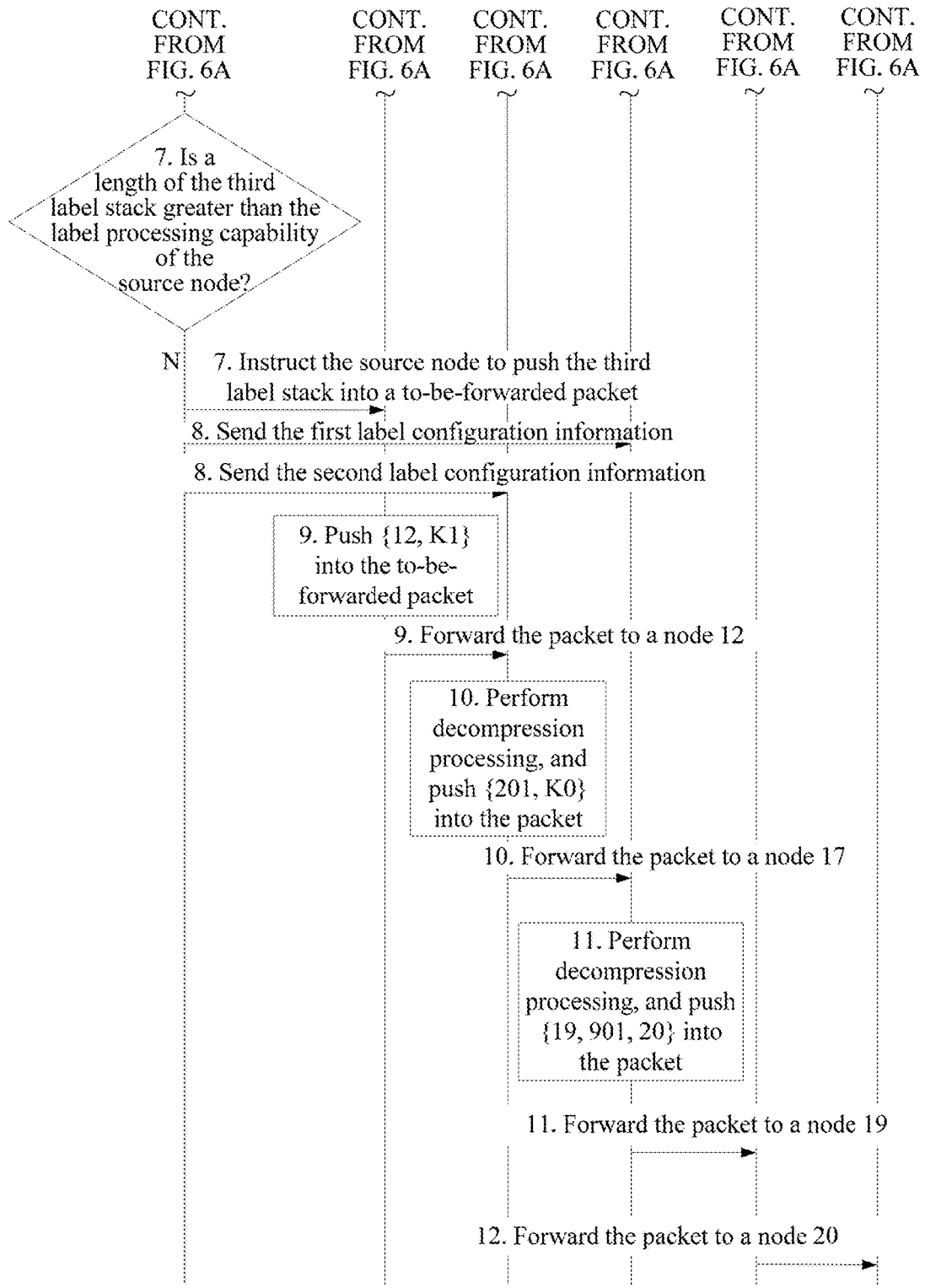

The method for compressing a label stack and the method for decompressing a label stack have been respectively described above. With reference to FIG. 1, FIG. 6A and FIG. 6B, and generating a label stack meeting a label processing capability of a source node is taken as an example, the solution provided by this embodiment of the present application will be illustrated below. In this example, the network device may be a controller integrating a function of the network device.

1. The controller obtains a service capability and a label processing capability of each node in a network, and establishes an LSP for a real-time service between a source node 10 and a destination node 20, to generate a first label stack {12, 901, 902, 201, 901, 19, 901, 20} corresponding to the LSP.

A label processing capability reported by the source node 10 is being capable of encapsulating four layers of labels in the packet, that is, $L_0=4$; a label processing capability reported by a node 12 is being capable of encapsulating three layers of labels in the packet, that is, $L_1=3$; a label processing capability reported by a node 17 is being capable of encapsulating three layers of labels in the packet, that is, $L_2=3$; a label processing capability reported by a node 19 is being capable of encapsulating one layer of label in the packet, that is, $L_3=1$; a label processing capability reported by the destination node 20 is being capable of encapsulating four layers of labels in the packet, that is, $L_4=4$.

2. The controller selects a first node label.

Based on the first label stack {12, 901, 902, 201, 901, 19, 901, 20}, the controller may obtain a quantity $M_i$ of labels associated with each node on the LSP. A quantity of labels associated with the source node 10 is $M_0=8$; a quantity of labels associated with the node 12 is $M_1=5$; a quantity of labels associated with the node 17 is $M_2=3$; a quantity of labels associated with the node 19 is $M_3=1$; and a quantity of labels associated with the node 20 is $M_4=0$.

The controller calculates a first difference value $\Delta_i=L_i-M_i$ corresponding to each node on the LSP. The source node 10 corresponds to $\Delta_0=-4$; the node 12 corresponds to $\Delta_1=-2$; the node 17 corresponds to $\Delta_2=0$; the node 19 corresponds to $\Delta_3=2$; and the destination node 20 corresponds to $\Delta_4=4$.

The controller may select a label 201 as the first node label. For the node 17 corresponding to the first node label 201, $L_2=3$ is not less than two, $\Delta_2=0$ is not less than zero, and compared with $M_3=1$ and $M_4=0$, $M_2=3$ is the largest.

Optionally, before calculating the first difference value $\Delta_i$ corresponding to each node, the controller may perform preprocessing as follows:

(1) A node label corresponding to a node of which a label processing capability is one is eliminated. For example, in the foregoing example, a node label corresponding to the node 19 may be eliminated.

(2) When a quantity of labels after a node label corresponding to the destination node is zero, the node label corresponding to the destination node is eliminated. For example, in the foregoing example, a node label corresponding to the destination node 20 may be eliminated.

After the foregoing preprocessing, the controller may calculate $\Delta_0$, $\Delta_1$ and $\Delta_2$, which is conducive to improving efficiency of calculating $\Delta_i$ by the controller compared with a solution of performing no preprocessing. It should be noted that eliminating a node label may be understood as that the node label cannot serve as the first node label.

Optionally, before selecting the first node label, the controller may further perform predetermining as follows according to the label processing capability of the source node and a label included by the first label stack.

The controller determines whether the first label stack includes only one destination node label and whether a quantity of labels after the destination node label is zero. If yes, the controller may directly perform compression processing on the first label stack according to the label processing capability of the source node. If no, the controller may continue to determine whether the label processing capability of the source node is less than two; and if no, select the first node label according to the solution provided by this embodiment of the present application; or if yes, which indicates that the source node cannot successfully establish the LSP, directly terminate a compression processing process. Compared with a solution in which the LSP cannot be successfully established after compression processing, predetermining may be conducive to improving compression processing efficiency in this embodiment of the present application.

For example, for a first label stack {901, 902, 903, 904, 905, 906, 20}, the first label stack includes only one destination node label 20, and a quantity of labels after the label 20 is zero. If a label processing capability of a source node is one, that is, only one layer of label can be encapsulated, the labels 901, 902, 903, 904, 905, 906 and 20 may be replaced with a compression label K. In this way, after performing a related service according to an instruction of a service label, the source node may push the label 20 into a packet, and forward the packet to the node 20.

3. The controller performs first-time compression processing on the first label stack, and replaces {901, 19, 901, 20} with a first compression label K0 to generate a second label stack {12, 901, 902, 201, K0}, and the controller may also record first label configuration information K0={901, 19, 901, 20}.

4. The controller determines whether a length of the second label stack is greater than a label processing capability of the source node; and if yes, selects a second node label from the second label stack, and performs second-time compression processing; or if no, instructs the source node to push the second label stack into a to-be-forwarded packet.

In this example, the length of the second label stack is five, and the label processing capability of the source node 10 is four; therefore, the second node label needs to be selected.

5. The controller selects the second node label.

Based on the second label stack {12, 901, 902, 201, K0}, a quantity of labels associated with the source node 10 is $M'_0=5$, and $\Delta'_0=L_0-M'_0=-1$; a quantity of labels associated with the node 12 is $M'_1=2$, and $\Delta'_1=L_1-M'_1=1$; a quantity of labels associated with the node 17 is $M'_2=1$, and $\Delta'_2=L_2-M'_2=2$. Correspondingly, the controller may select the label 12 as the second node label. For the node 12 corresponding to the second node label, $L_1=3$, which is not less than two, $\Delta'_1=1$ is not less than zero, and compared with $M'_2=1$, $M'_1=2$ is the largest.

Optionally, before calculating a second difference value $\Delta'_i$ corresponding to each node, the controller may eliminate a node label 17 in advance.

6. The controller performs second-time compression processing on the second label stack, and replaces {901, 902, 201, K0} with a second compression label K1 to generate a third label stack {12, K1}, and the controller may also record second label configuration information K1={901, 902, 201, K0}.

Optionally, the controller may use a different compression label during each compression processing, that is, there is no same compression labels in the network. Alternatively, the controller may use a different compression label during each compression processing for one node, that is, a single node does not have same compression labels.

7. The controller determines whether a length of the third label stack is greater than the label processing capability of the source node; and if yes, selects a third node label from the third label stack, and performs third-time compression processing; or if no, instructs the source node to push the third label stack into the to-be-forwarded packet.

In this example, the length of the third label stack is two, and the label processing capability of the source node 10 is four; therefore, the source node may be instructed to push the third label stack into the to-be-forwarded packet.

After performing compression processing on the first label stack according to the foregoing steps 1 to 7, the controller compresses a label stack corresponding to the LSP from the first label stack with the length of eight to the third label stack with the length of two. In this way, when the third label stack is pushed into the packet, a total length of the packet can be reduced, which is conducive to transmitting the packet in the network.

8. Referring to FIG. 1, the controller sends the first label configuration information K0={901, 19, 901, 20} to a node 17, and sends the second label configuration information K1={901, 902, 201, K0} to a node 12.

9. The source node pushes the third label stack {12, K1} into the to-be-forwarded packet, and forwards the packet to the node 12 according to a shortest path.

10. The node 12 receives the packet forwarded by the source node 10, obtains the third label stack {12, K1} from the packet; and after a node SID 12 is popped up, determines that a topmost label K1 is a compression label, obtains the second label configuration information, performs decompression processing, and restores K1 to the labels 901, 902,

201, and K0, so as to generate a fourth label stack {901, 902, 201, K0}. The node 12 performs services corresponding to service SIDs 901 and 902 on the packet, pushes a fifth label stack {201, K0} into the packet, and forwards the packet to the node 17 through a link corresponding to a link SID 201.

11. The node 17 receives the packet forwarded by the node 12, and obtains the fifth label stack {201, K0} from the packet; and after the link SID 201 is popped up, determines that a topmost label K0 is a compression label, obtains the first label configuration information, performs decompression processing, and restore K0 to the labels 901, 19, 901 and 20, so as to generate a sixth label stack {901, 19, 901, 20}. The node 17 performs the service corresponding to the service SID 901 to the packet, pushes a seventh label stack {19, 901, 20} into the packet, and forwards the packet to the node 19 according to a shortest path.

12. The node 19 receives the packet forwarded by the node 17, and obtains the seventh label stack {19, 901, 20}; and after the node SID 19 is popped up, performs the service corresponding to the service SID 901, pushes an eighth label stack {20} into the packet, and forwards the packet to the node 20 according to a shortest path.

13. The node 20 receives the packet forwarded by the node 19, obtains the eighth label stack {20}; and after the node SID 20 is popped up, determines that the node SID 20 is a bottommost label, and terminates forwarding of the packet.

When forwarding the packet, a node on the LSP may perform, according to needs, decompression processing on the label stacks compressed by the controller according to steps 8 to 13, so as to ensure that the node can use the label stacks compressed by the controller to correctly perform packet processing.

Figure 7:
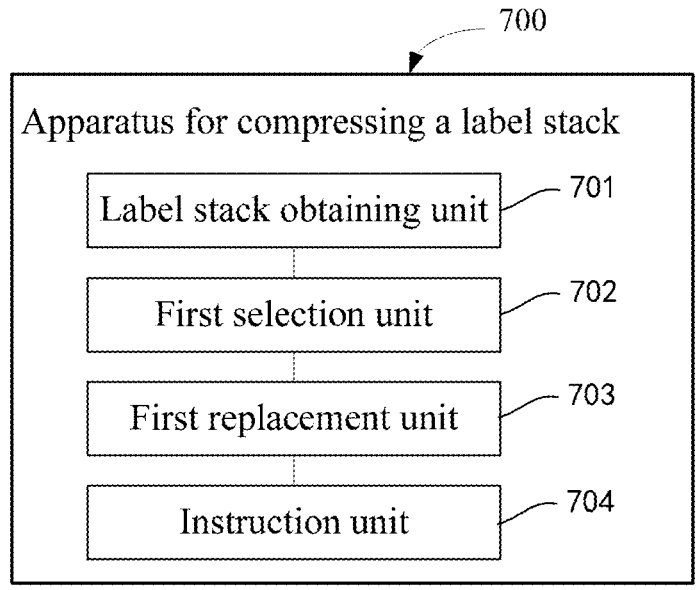
FIG. 7 is a schematic diagram of composition of an apparatus for compressing a label stack according to an embodiment of the present application.

Corresponding to the foregoing method for compressing a label stack, an embodiment of the present application further provides an apparatus 700 for decompressing a label stack. The apparatus 700 may be the network device in the foregoing embodiment shown in FIG. 2 to FIG. 4. The apparatus 700 may be a router or a switch, or the apparatus 700 is a controller in a control and forwarding separation network architecture. Referring to FIG. 7, the apparatus 700 includes:

a label stack obtaining unit 701, configured to obtain a first label stack corresponding to a forwarding path, where the first label stack includes node labels corresponding to each node on the forwarding path;

a first selection unit 702, configured to select a first node label from the first label stack obtained by the label stack obtaining unit, where when forwarding a packet, a node corresponding to the first node label is capable of encapsulating at least two layers of labels in the packet;

a first replacement unit 703, configured to replace at least two adjacent labels located after the first node label in the first label stack with a first compression label, to generate a second label stack; and an instruction unit 704, configured to instruct a source node on the forwarding path to perform packet processing according to the second label stack generated by the first replacement unit.

After obtaining the first label stack corresponding to the LSP, the decompressing apparatus in this embodiment of the present application may select one first node label from the first label stack, and replace the at least two adjacent labels located after the first node label in the first label stack with the first compression label to generate the second label stack, where the node corresponding to the first node label can encapsulate at least two layers of labels in the packet when forwarding the packet, and the at least two adjacent labels refer to that labels are contiguous in the first label stack.

For example, the first label stack is {12, 901, 902, 201, 901, 19, 901, 20}, the first node label is a node label 201, {901, 19, 901, 20} may be replaced with a first compression label K0 to generate a second label stack {12, 901, 902, 201, K0}. In this example, the first label stack includes eight labels, the second label stack includes five labels, and a length of a label stack may be shortened through compression processing. In this way, when the second label stack is pushed into a to-be-forwarded packet, it is conducive to saving packet space.

Optionally, the first selection unit includes:

a first obtaining unit, configured to obtain $L_i$ and $M_i$, where $L_i$ represents a quantity of layers of labels a node corresponding to a node label i is capable of encapsulating in the packet, $M_i$ represents a quantity of labels associated with the node label i, the labels associated with the node label i are a node label i+1 and a label after the node label i+1, $1 \leq i < n$, and n is a quantity of nodes on the forwarding path;

a first calculation unit, configured to calculate, according to $L_i$ and $M_i$ obtained by the first obtaining unit, a first difference value $\Delta_i = L_i - M_i$; and a selection subunit, configured to select the first node label, where the node corresponding to the first node label is capable of encapsulating not less than two layers of labels in the packet, and a first difference value corresponding to the first node label is not less than zero.

Optionally, if the first label stack includes at least two node labels whose corresponding nodes are capable of encapsulating not less than two layers of labels in the packet, and first difference values corresponding to the at least two node labels are not less than zero, a quantity of labels associated with the first node label selected by the selection subunit is the largest among quantities of labels associated with the at least two node labels.

Optionally, if i=n, the quantity $M_n$ of labels associated with the node label i obtained by the first obtaining unit is zero, or $M_n$ is a quantity of labels after the node label n.

Optionally, the apparatus further includes:

a second obtaining unit, configured to obtain $L_j$ and $M_j$ after the first replacement unit generates the second label stack, where $L_j$ represents a quantity of layers of labels a node corresponding to a node label j is capable of encapsulating in the packet, $M_j$ represents a quantity of labels associated with the node label j, the labels associated with the node label j are a node label j+1 and a label after the node label j+1, $1 \leq j < m$, and $m \leq n$;

a second calculation unit, configured to calculate, according to $L_j$ and $M_j$ obtained by the second obtaining unit, a second difference value $\Delta_j = L_j - M_j$;

a second selection unit, configured to select a second node label, where a node corresponding to the second node label is capable of encapsulating not less than two layers of labels in the packet, and a second difference value corresponding to the second node label is not less than zero; and a second replacement unit, configured to replace at least two adjacent labels located after the second node label in the second label stack with a second compression label, to generate a third label stack, where the at least two adjacent labels after the second node label include the first compression label; and correspondingly, the instruction unit is specifically configured to instruct the source node on the forwarding path to perform packet processing according to the third label stack generated by the second replacement unit.

Optionally, the apparatus further includes:

a determining unit, configured to determine, before the first selection unit selects the first node label, whether the source node is capable of encapsulating at least two layers of labels in the packet, and if the source node is capable of encapsulating at least two layers of labels in the packet, instruct the first selection unit to select the first node label.

Through the foregoing technical solution, when a forwarding node forwards a packet, a network device may shorten a length of a label stack pushed into the packet, and further reduce a total length of the packet, which is conducive to transmitting the packet in a network.

Figure 8:
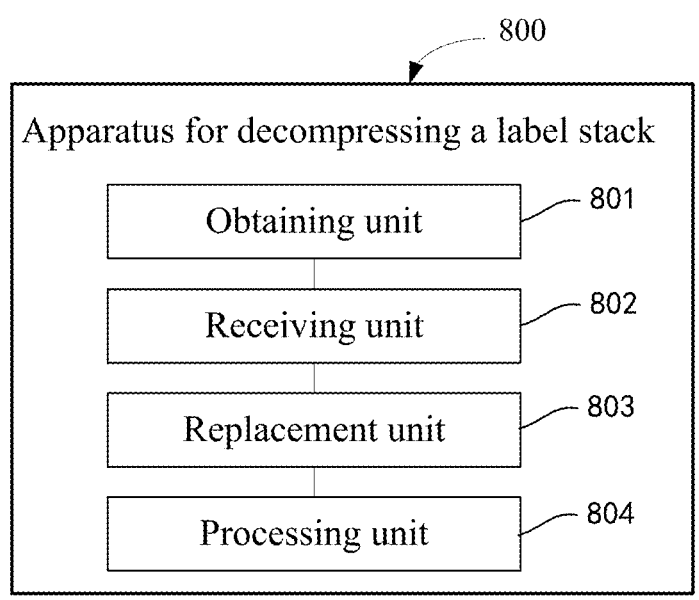
FIG. 8 is a schematic diagram of composition of an apparatus for decompressing a label stack according to an embodiment of the present application.

Corresponding to the method shown in FIG. 5, an embodiment of the present application further provides an apparatus 800 for decompressing a label stack. The apparatus 800 may be the forwarding node in the foregoing embodiment shown in FIG. 5, and the apparatus 800 may be a router or a switch. Referring to FIG. 8, the apparatus 800 includes:

an obtaining unit 801, configured to obtain label configuration information of a node, where the label configuration information includes a correspondence between a compression label and compressed labels, and the compressed labels include at least two labels;

a receiving unit 802, configured to receive a packet sent from a source node, where the packet includes a first label stack, and the first label stack includes the compression label;

a replacement unit 803, configured to replace, according to the label configuration information obtained by the obtaining unit, the compression label in the first label stack comprised in the packet received by the receiving unit with the compressed labels, to generate a second label stack; and a processing unit 804, configured to process the packet according to the second label stack.

The compressing apparatus performs compressing procession on a label stack corresponding to an LSP, and may instruct, after generating a compressed label stack, a source node on the LSP to push the compressed label stack into a to-be-forwarded packet, and process the packet according to the compressed label stack. In order to ensure that a node on the LSP can use the compressed label stack to correctly process the packet, this embodiment of the present application further provides a decompressing apparatus accordingly. As an example, the decompressing apparatus may be disposed in a forwarding node on the LSP, after receiving the packet sent from the source node, the decompressing apparatus may obtain the compressed label stack from the packet, that is, the first label stack in the example shown in FIG. 7, perform decompression processing on the compression label in the first label stack according to the corresponding label configuration information, and replace the compression label with the compressed labels to generate the second label stack. In this way, packet processing may be correctly performed according to the second label stack.

Optionally, the processing unit is specifically configured to forward, when a topmost label of the second label stack is a node label, the packet to a node corresponding to the node label; or the processing unit is specifically configured to perform, when a topmost label of the second label stack is a service label, a service corresponding to the service label on the packet.

Figure 9:
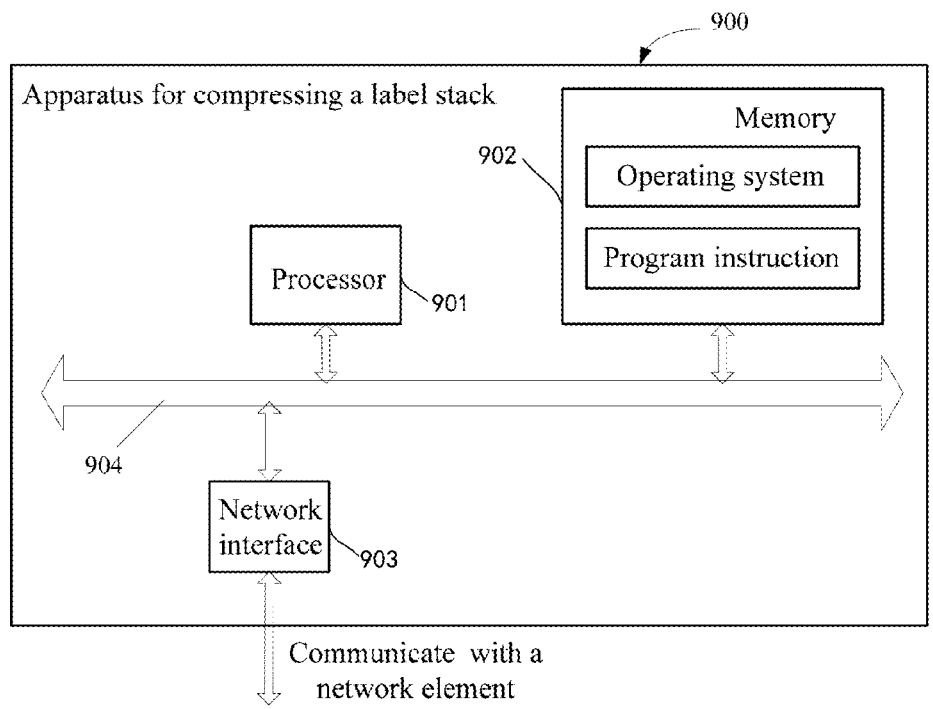
FIG. 9 is a schematic diagram of hardware composition of an apparatus for compressing a label stack according to an embodiment of the present application.

Referring to FIG. 9, an embodiment of the present application further provides an apparatus 900 for compressing a label stack. The apparatus 900 may be the network device in the foregoing embodiment shown in FIG. 2 to FIG. 4. The apparatus 900 may be a router or a switch, or the apparatus 900 is a controller in a control and forwarding separation network architecture. The apparatus 900 includes: a processor 901, a memory 902, a network interface 903, and a bus system 904.

The bus system 904 is configured to couple hardware components of the compressing apparatus together.

The network interface 903 is configured to implement a communication connection between the compressing apparatus and at least one other network element, and manners such as Internet, a wide area network, a local network, and a metropolitan area network may be used.

The memory 902 is configured to store a program instruction and data.

The processor 901 is configured to read the program instruction and the data stored in the memory 902 to perform the following operations:

obtaining a first label stack corresponding to a forwarding path through the internet interface, where the first label stack includes node labels corresponding to each node on the forwarding path;

selecting a first node label from the first label stack, where when forwarding a packet, a node corresponding to the first node label is capable of encapsulating at least two layers of labels in the packet;

replacing at least two adjacent labels located after the first node label in the first label stack with a first compression label, to generate a second label stack; and instructing a source node on the forwarding path to perform packet processing according to the second label stack.

Optionally, the processor may perform the following operations to select the first node label from the first label stack:

obtaining $L_i$ and $M_i$, where $L_i$ represents a quantity of layers of labels a node corresponding to a node label i is capable of encapsulating in the packet, $M_i$ represents a quantity of labels associated with the node label i, the labels associated with the node label i are a node label i+1 and a label after the node label i+1, $1 \le i < n$, and n is a quantity of nodes on the forwarding path;

calculating a first difference value $\Delta_i = L_i - M_i$; and selecting the first node label, where the node corresponding to the first node label is capable of encapsulating not less than two layers of labels in the packet, and a first difference value corresponding to the first node label is not less than zero.

Optionally, if the first label stack includes at least two node labels whose corresponding nodes are capable of encapsulating not less than two layers of labels in the packet, and first difference values corresponding to the at least two node labels are not less than zero, a quantity of labels associated with the first node label selected by the processor is the largest among quantities of labels associated with the at least two node labels.

Optionally, if i=n, $M_n$ is zero, or $M_n$ is a quantity of labels after the node label n.

Optionally, after the second label stack is generated, the processor is further configured to perform the following operations:

obtaining $L_j$ and $M_j$, where $L_j$ represents a quantity of layers of labels a node corresponding to a node label j is capable of encapsulating in the packet, $M_j$ represents a quantity of labels associated with the node label j, the labels associated with the node label j are a node label j+1 and a label after the node label j+1, $1 \le j < m$, and $m \le n$;

calculating a second difference value $\Delta_j = L_j - M_j$;

selecting a second node label, where a node corresponding to the second node label is capable of encapsulating not less than two layers of labels in the packet, and a second difference value corresponding to the second node label is not less than zero;

replacing at least two adjacent labels located after the second node label in the second label stack with a second compression label, to generate a third label stack, where the at least two adjacent labels after the second node label include the first compression label; and correspondingly, instructing the source node on the forwarding path to perform packet processing according to the third label stack.

Optionally, before selecting the first node label from the first label stack, the processor may further be configured to perform the following operation:

determining whether the source node is capable of encapsulating at least two layers of labels in the packet, and if the source node is capable of encapsulating at least two layers of labels in the packet, performing a step of selecting a first node label from the first label stack.

Figure 10:
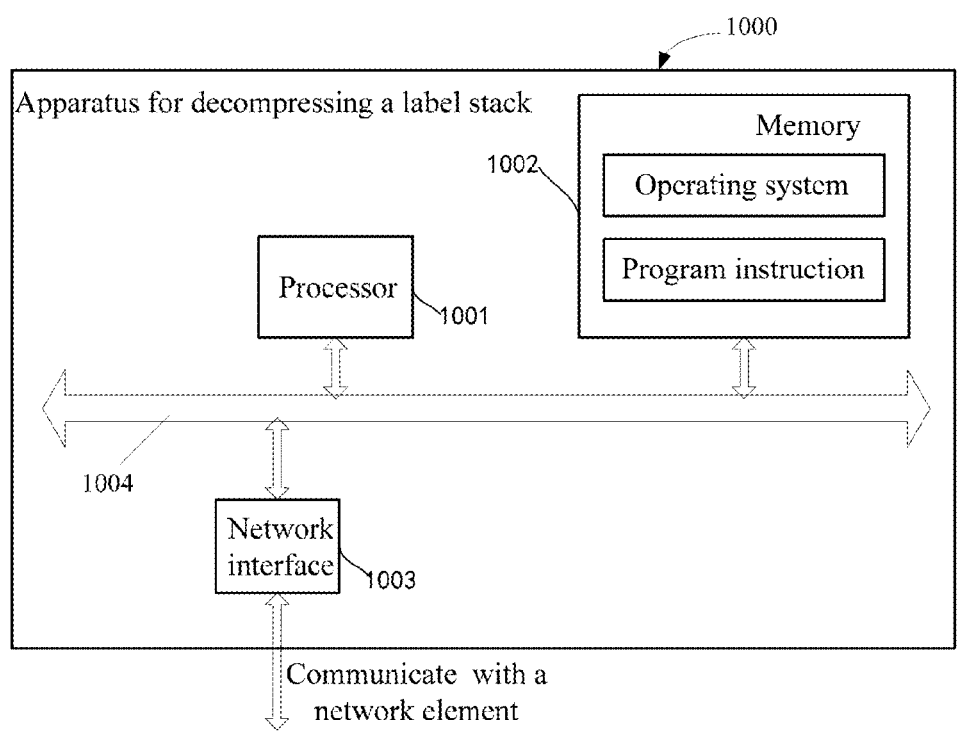
FIG. 10 is a schematic diagram of hardware composition of an apparatus for decompressing a label stack according to an embodiment of the present application.

An embodiment of the present application further provides hardware composition of an apparatus 1000 for decompressing a label stack. The apparatus 1000 may be the forwarding node in the foregoing embodiment shown in FIG. 5. Referring to the schematic diagram shown in FIG. 10, the apparatus may include: a processor 1001, a memory 1002, a network interface 1003, and a bus system 1004.

The bus system 1004 is configured to couple hardware components of the decompressing apparatus together.

The network interface 1003 is configured to implement a communication connection between the decompressing apparatus and at least one other network element, and manners such as Internet, a wide area network, a local network, and a metropolitan area network may be used.

The memory 1002 is configured to store a program instruction and data.

The processor 1001 is configured to read the instruction and the data stored in the memory 1002, to perform the following operations:

obtaining label configuration information of the forwarding node, where the label configuration information includes a correspondence between a compression label and compressed labels, and the compressed labels include at least two labels;

receiving a packet sent from a source node, where the packet includes a first label stack, and the first label stack includes the compression label;

replacing according to the label configuration information, the compression label in the first label stack with the compressed labels, to generate a second label stack; and processing the packet according to the second label stack.

Optionally, if a topmost label of the second label stack is a node label, the processor forwards the packet to a node corresponding to the node label; or if a topmost label of the second label stack is a service label, the processor performs a service corresponding to the service label on the packet.

It should be noted that, the processor in this embodiment of the present application may be an integrated circuit chip, and has a signal processing capability. In an implementation process, each step of the foregoing method may be completed through an integrated logic circuit of hardware or instructions in a software form in the processor. These instructions may be cooperatively implemented and controlled by the processor therein, and configured to perform the method disclosed in the embodiments of the present application. The foregoing processor may also be a general processor, a digital signal processor (DSP), an application-specific integrated circuit, a field programmable gate array (FPGA) or other programmable logic devices, a discrete gate or transistor logic device, a discrete hardware component, or the like.

The foregoing general processor may be a microprocessor, or the processor may also be any common processor, decoder or the like. The steps of the method disclosed in the embodiments of the present application may be directly performed by a hardware processor, or performed by using a combination of a hardware module and a software module in a processor. The software module may be located in a storage medium mature in the art, such as a random access memory, a flash memory, a read-only memory, a programmable read-only memory, an electrically erasable programmable memory, or a register.

In addition, it should be noted that, the bus system further includes a power bus, a control bus, and a status signal bus besides a data bus. However, for the sake of clearness, various buses are marked as the bus system in FIG. 8 and FIG. 9.

Through the description of the embodiments above, a person skilled in the art may clearly learn that all or some of the steps in the methods in the foregoing embodiments may be implemented through software plus a universal hardware platform. Based on such an understanding, the solution of the application substantially, or the portion contributing to the prior art may be embodied in a form of a software product, and the software product may be stored in storage media such as a ROM/RAM, a hard disk, and a compact disk, and contain several instructions for enabling a computer device (which may be a personal computer, a server, or a network communication device such as a media gateway) to execute the method described in the embodiments or in some certain parts of the embodiments.

It should be noted that, each of the embodiments in the description is described in a progressive manner, the identical or similar parts between the embodiments refer to each other, and what is highlighted in each embodiment is the difference with other embodiments. In particular, for the device and system embodiments, since they are basically similar to the method embodiments, the illustration is simple and related portions may refer to partial illustration of the method embodiments. The device and system embodiments described above are merely exemplary, where units described as separate components may be or may not be physically separated, and components displayed as units may be or may not be physical units, namely, be located at one place or distributed on a plurality of network units. Some or all of the modules may be selected to achieve the purposes of the solutions in the embodiments according to actual demands. A person of ordinary skill in the art can understand and implement the present embodiments without creative efforts.

The foregoing descriptions are merely preferable embodiments of the present application, rather than limiting the protection scope of the present application. It should be noted that, a person of ordinary skill in the art may further make various improvements and modifications without departing from the principle of the present application, and these improvements and modifications shall be encompassed in the protection scope of the present application.

What is claimed is:

1. A method for compressing a label stack, wherein the method comprises:

obtaining, by a network device, a first label stack corresponding to a forwarding path, wherein the first label stack comprises node labels corresponding to each node on the forwarding path;

selecting, by the network device, a first node label from the first label stack, wherein when forwarding a packet, a node corresponding to the first node label is configured to encapsulate at least two layers of labels in the packet;

replacing, by the network device, at least two adjacent labels located after the first node label in the first label stack with a first compression label, to generate a second label stack;

sending, by the network device, label configuration information to the node corresponding to the first node label, wherein the label configuration information includes a correspondence between the first compression label and the at least two adjacent labels; and instructing, by the network device, a source node on the forwarding path to perform packet processing according to the second label stack.

2. The method according to claim 1, wherein the selecting, by the network device, the first node label from the first label stack comprises:

obtaining, by the network device, $L_i$ and $M_i$, wherein $L_i$ represents a quantity of layers of labels a node corresponding to a node label i is configured to encapsulate in the packet, $M_i$ represents a quantity of labels associated with the node label i, labels associated with the node label i are a node label i+1 and a label after the node label 1+1, $1 \leq i < n$, and n is a quantity of nodes on the forwarding path;

calculating, by the network device, a first difference value $\Delta_i = L_i - M_i$; and selecting, by the network device, the first node label, wherein the node corresponding to the first node label is configured to encapsulate not less than two layers of labels in the packet, and a first difference value corresponding to the first node label is not less than zero.

3. The method according to claim 2, wherein:

the first label stack comprises at least two node labels whose corresponding nodes are configured to encapsulate not less than two layers of labels in the packet, and first difference values corresponding to the at least two node labels are not less than zero, and the quantity of labels associated with the first node label is the largest among quantities of labels associated with the at least two node labels.

4. The method according to claim 2, wherein if i=n, $M_n$ is one of followings: zero and a quantity of labels after a node label n.

5. The method according to claim 2, wherein after the second label stack is generated, the method further comprises:

obtaining, by the network device, $L_j$ and $M_j$, wherein $L_j$ represents a quantity of layers of labels a node corresponding to a node label j is configured to encapsulate in the packet, $M_j$ represents a quantity of labels associated with the node label j, the labels associated with the node label j are a node label j+1 and a label after the node label j+1, $1 \leq j < m$, and $m \leq n$;

calculating, by the network device, a second difference value $\Delta_j = L_j - M_j$;

selecting, by the network device, a second node label in the second label stack, wherein a node corresponding to the second node label is configured to encapsulate not less than two layers of labels in the packet, a second difference value corresponding to the second node label is not less than zero, and at least two adjacent labels after the second node label in the second label stack comprise the first compression label; and replacing, by the network device, the at least two adjacent labels located after the second node label in the second label stack with a second compression label, to generate a third label stack;

wherein the instructing, by the network device, the source node on the forwarding path to perform the packet processing according to the second label stack comprises:

instructing, by the network device, the source node on the forwarding path to perform the packet processing according to the third label stack.

6. The method according to claim 1, wherein before the selecting, by the network device, the first node label from the first label stack, the method further comprises:

determining, by the network device, whether the source node is configured to encapsulate at least two layers of labels in the packet, and performing the step of selecting the first node label from the first label stack is based on determining that the source node is capable of encapsulating at least two layers of labels in the packet.

7. The method according to claim 1, wherein the node label is one of a node segment identification (SID) and a link SID.

8. An apparatus for compressing a label stack, the apparatus comprising:

a processor; and a memory storing instructions that, when executed by the processor, cause the apparatus to perform the steps of:

obtaining a first label stack corresponding to a forwarding path, wherein the first label stack comprises node labels corresponding to each node on the forwarding path;

selecting a first node label from the first label stack, wherein when forwarding a packet, a node corresponding to the first node label is configured to encapsulate at least two layers of labels in the packet;

replacing at least two adjacent labels located after the first node label in the first label stack with a first compression label, to generate a second label stack;

sending label configuration information, to the node corresponding to the first node label, wherein the label configuration information includes a correspondence between the first compression label and the at least two adjacent labels; and instructing a source node on the forwarding path to perform packet processing according to the second label stack.

9. The apparatus according to claim 8, wherein the selecting the first node label from the first label stack comprises:

obtaining $L_i$ and $M_i$, wherein $L_i$ represents a quantity of layers of labels a node corresponding to a node label i is configured to encapsulate in the packet, $M_i$ represents a quantity of labels associated with the node label i, labels associated with the node label i are a node label i+1 and a label after the node label i+1, $1 \leq i < n$, and n is a quantity of nodes on the forwarding path;

calculating, according to $L_i$ and a first difference value $\Delta_i = L_i - M_i$; and selecting the first node label, wherein the node corresponding to the first node label is configured to encapsulate not less than two layers of labels in the packet, and a first difference value corresponding to the first node label is not less than zero.

10. The apparatus according to claim 9, wherein the executing the instructions stored in the memory further causes the apparatus to perform the steps of:

obtaining $L_j$ and $M_j$ after generating the second label stack, wherein $L_j$ represents a quantity of layers of labels a node corresponding to a node label j is configured to encapsulate in the packet, $M_j$ represents a quantity of labels associated with the node label j, the labels associated with the node label j are a node label j+1 and a label after the node label j+1, 1≤j<m, and m≤n;

calculating, according to $L_j$ and $M_j$, a second difference value $\Delta_j = L_j - M_j$;

selecting a second node label in the second label stack, wherein a node corresponding to the second node label is configured to encapsulate not less than two layers of labels in the packet, a second difference value corresponding to the second node label is not less than zero, and at least two adjacent labels after the second node label in the second label stack comprise the first compression label; and replacing the at least two adjacent labels located after the second node label in the second label stack with a second compression label, to generate a third label stack; and wherein the instructing the source node on the forwarding path to perform the packet processing according to the second label stack is based on the third label stack.

11. The apparatus according to claim 8, wherein the executing the instructions stored in the memory further causes the apparatus to perform the steps of:

determining, before the selecting the first node label, whether the source node is configured to encapsulate at least two layers of labels in the packet, and performing the step of selecting the first node label from the first label stack is based on determining that the source node is capable of encapsulating at least two layers of labels in the packet.

12. A forwarding node for decompressing a label stack, the forwarding node comprising:

a processor; and a memory storing instructions that, when executed by the processor, cause the forwarding node to perform the steps of:

obtaining label configuration information of the forwarding node, wherein the label configuration information comprises a correspondence between a compression label and compressed labels, and wherein the compressed labels comprise at least two labels;

receiving a packet sent from a source node, wherein the packet comprises a first label stack, and the first label stack comprises the compression label;

replacing, according to the label configuration information, the compression label in the first label stack comprised in the packet with the compressed labels, to generate a second label stack, wherein the compressed labels comprise at least two adjacent labels located after a node label in the second label stack; and processing the packet according to the second label stack.

13. The forwarding node according to claim 12, wherein the processing the packet comprises:

forwarding, in response to determining that the node label is a topmost label of the second label stack, the packet to a node corresponding to the node label.

14. The forwarding node according to claim 12, wherein the processing the packet comprises:

performing, in response to determining that a topmost label of the second label stack is a service label, a service corresponding to the service label for the packet.

* * * * *